US012724987B2

(12) United States Patent
Singh et al.

(10) Patent No.: US 12,724,987 B2
(45) Date of Patent: Sep. 1, 2026

(54) METHOD AND SYSTEM FOR PROCESSING DATA FOR DATA TRANSLATION

(71) Applicant: HONEYWELL INTERNATIONAL INC., Charlotte, NC (US)

(72) Inventors: Ankit Singh, Apex, NC (US); Shashidhar Kotta, Plainsboro, NJ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 156 days.

(21) Appl. No.: 18/650,135

(22) Filed: Apr. 30, 2024

(65) Prior Publication Data

US 2025/0335724 A1 Oct. 30, 2025

(51) Int. Cl.
*G06F 40/58* (2020.01)
*G06F 40/44* (2020.01)
*G06F 40/45* (2020.01)

(52) U.S. Cl.
CPC .............. *G06F 40/58* (2020.01); *G06F 40/44* (2020.01); *G06F 40/45* (2020.01)

(58) Field of Classification Search
CPC .......... G06F 40/40; G06F 40/58; G06F 40/44; G06F 40/49; G06F 40/216; G06F 40/263; G06F 40/30; G06F 40/42; G06F 40/45; G06N 20/00; G10L 15/30; G10L 15/005; G10L 15/04; G10L 15/183; G10L 15/16
USPC ........................................................... 704/2
See application file for complete search history.

(56) References Cited

U.S. PATENT DOCUMENTS 10,423,727 B1 * 9/2019 Juneja .................... G10L 13/00
11,914,954 B2 * 2/2024 Fox ...................... G06N 3/0464
12,056,443 B1 * 8/2024 Jaiswal ................ G06N 3/0455
2007/0112714 A1 * 5/2007 Fairweather ........... G06F 8/427 706/46
2009/0171999 A1 * 7/2009 McColl ............... G06F 16/2465
2010/0235314 A1 * 9/2010 Nolan .................. G06F 16/685 704/235
2014/0236566 A1 * 8/2014 Schreier ................ G06Q 30/08 704/2
2015/0088484 A1 * 3/2015 Bostick .................. G06F 40/40 704/2

(Continued)

*Primary Examiner* — Vijay B Chawan
(74) *Attorney, Agent, or Firm* — Alston & Bird LLP

(57) ABSTRACT

The present disclosure provides a method for processing data and service system thereof. The present disclosure comprises a steps for receiving a plurality of data from one or more users, wherein the plurality of data includes text in a source language. The present disclosure further comprises steps for storing the plurality of data in a delimited format, wherein the plurality of data is arranged in one or more rows and one or more columns based on the plurality of information associated with one or more users, wherein the data in the one or more rows and the one or more columns are stored in the form of one or more cells comprising one or more characters. The present disclosure further comprises steps for identifying the cell with largest character count from the one or more rows and selecting the row corresponding to the identified cell. The present disclosure further comprises steps for determining if the source language of the selected row is a non-English text; and in response to determining that the selected row is a non-English text, transmitting the selected row to a data translation engine for conversion from source language to target language.

20 Claims, 12 Drawing Sheets

(56) References Cited

U.S. PATENT DOCUMENTS

| | | | | |
|---|---|---|---|---|
| 2017/0083845 | A1* | 3/2017 | Karcher | G06Q 10/06313 |
| 2017/0192963 | A1* | 7/2017 | Ni | G06F 40/58 |
| 2017/0371866 | A1* | 12/2017 | Eck | G06F 40/49 |
| 2020/0302126 | A1* | 9/2020 | Malcangio | G10L 15/30 |
| 2021/0271810 | A1* | 9/2021 | Nadejde | G06N 3/09 |
| 2022/0138413 | A1* | 5/2022 | Zou | G06F 16/2291<br>715/234 |
| 2024/0419706 | A1* | 12/2024 | Gutierrez | G06F 40/166 |
| 2025/0291828 | A1* | 9/2025 | Wood | G06F 16/283 |
| 2025/0335709 | A1* | 10/2025 | Wood | G06F 16/3329 |
| 2025/0335724 | A1* | 10/2025 | Singh | G06F 40/58 |

* cited by examiner

300a

| Column 1 | Column 2 | Column 3 | Column 4 | Column 5 | Column 6 |
|---|---|---|---|---|---|
| ABCD | ABCD | ABCD | ABCD | ABCD | ABCD |
| ABCD | ABCD | ABCDE | ABCD | ABCD | ABCD |
| ABCD | ABCD | ABCD | ABCD | ABCD | ABCD |
| ABCD | ABCD | ABCD | ABCD | ABCD | ABCD |

FIG. 3a

| Column 1 | Column 2 | Column 3 | Column 4 | Column 5 | Column 6 |
|---|---|---|---|---|---|
| 09 | 01 | 13 | 05 | 14 | 03 |
| 10 | 02 | A | B | 16 | 01 |
| 11 | 03 | 15 | B | 18 | 13 |
| 10 | 04 | 19 | text | 20 | 05 |

300c

301c

| | |
|---|---|
| ABCD | ABCD |
| ABCDE | ABCD |
| ABCD | ABCD |
| ABCD | ABCD |
| ABCD | ABCD |
| ABCD | ABCD1 |
| ABCD | ABCD |
| ABCDF | Non English text |
| ABCD | ABCD |
| ABCD | ABCD |
| ABCD3 | ABCD |
| ABCD | ABCD |
| ABCD | ABCD8 |
| ABCD | ABCD |

| USER NAME | LOCATION | OTHER DETAILS |
|---|---|---|
| A | YYY | E |
| JOHN | GERMANY | G |
| C | ZZZ | I |
| D | NNN | K |

Previous user data 302d

Previous data received from same locality details 303d

| Column 1 | Column 2 | Column 3 | Column 4 | Column 5 |
|---|---|---|---|---|
| ABCD | Hash <Mar> | *Location of* E | *Location of 6* | ABCD |
| ABCD | Hash <had> | *Location of* G | *Location of 7* | ABCD |
| ABCD | Hash <a> | *Location of* I | *Location of 9* | ABCD |
| ABCD | Hash <little> | *Location of* K | *Location of 11* | ABCD |

FIG. 3d

METHOD AND SYSTEM FOR PROCESSING DATA FOR DATA TRANSLATION

FIELD OF INVENTION

The present disclosure relates to the field of data translation. Particularly, the present disclosure relates to processing data for data translation using a delimited data format.

BACKGROUND

Typically, translation of data is carried out using data translation engines. In the existing technology, the data which is commonly in the form of delimited format is fed into the data translation engine. The input data is converted into the desired language by the data translation engine. The delimited data format is a very commonly used data processing technique which helps in transferring plurality of data with plurality of information. The data fields which are arranged inside the delimited data format use various techniques to segregate data and save them in a specific format for the ease of transfer of data for any further processing such as translation. The various techniques used for arranging data include comma separated value (CSV) format amongst others. In the CSV format, a comma is typically used for segregating and arranging the field data.

The plurality of fields in the CSV format represent plurality of data and disclose various information. The various information stored in the CSV format may represent millions of records of customer data of an enterprise. The data when collected globally may belong to different languages. The data is arranged in a specific manner as per the format chosen by the user and is given to a data translation service provider for converting the data to the language of interest, preferably English. The cost of translation is purely based upon the quantum of data provided as input for the data translation. For example, if the input data belongs to millions of customers, the cost of translation would also run in to millions and the time taken for translation increases.

Therefore, there exists a need in the art to process the input data effectively and provide minimum data with effective information as input to the data translation service provider to optimize the cost as well as make the whole data translation process efficient and quicker.

Through applied effort, ingenuity, and innovation, the inventors have solved the above problem(s) by developing the solutions embodied in the present disclosure, the details of which are described further herein.

SUMMARY OF THE INVENTION

In general, embodiments of the present disclosure herein provide an efficient technique for processing plurality of data for data translation. Other implementations will be or will become, apparent to one with skill in the art upon examination of the following figures and detailed description. It is intended that all such additional implementations be included within this description be within the scope of the disclosure and be protected within the scope of the following claims.

The present disclosure provides an efficient technique for processing plurality of data for data translation. The plurality of data stored in the CSV format is segregated based on the particular information input by the user and are arranged in different rows and columns. The plurality of data stored in the row inside the CSV file arranges sub-data in the form of cell/column/field that may contain data as English or non-English text. The input data to translation engine is to be selected based on the cell with the source language as English. However, the selection of source language from the plurality of cells is difficult when the same is carried out for millions of data.

In an embodiment, the data stored in the one or more rows is parsed to find the largest character count to determine the source language. The cell with the largest character count is identified and the row which corresponds to the cell is selected and the processed for translation. The proposed technique reduces the number of rows given as input to the translation engine and therefore the amount of data given to the translation engine reduces and the cost involved in the process is minimized.

In another embodiment, the present disclosure proposes a technique that parses for fields that contain regular expressions for labels like "Description" "Issue" "Event Details" "Summary" "Text" etc. and then find the array of such fields and find the dominant non-English language in such fields. This process can improve accuracy and can be cost-effective.

In another embodiment, the present disclosure proposes a technique to find the non-English text per row and save it in the CSV file format at the end of each row. The entire dataset is split into the number of different non-English languages found in the entire CSV file and passed into the data translation engine for Document Translation. This would reduce the time taken to send each cell one at a time. The speed of Translation would be quicker on the document rather than individual cell which can also cause issues like Throttling.

In another embodiment, the present disclosure proposes a technique to improve the language detection by adding an explicit field in the record form UI which asks user to pick Language for the record. Particularly, the technique could be to associate the language chosen by user in a region for a particular site etc. which can be used to reconcile the old data that did not have this field. For example, if it is determined that user John Smith from Site A in Hamburg, Germany always chose German as the record language then we can parse old datasets and assign German to all records created for this site and this user for this enterprise.

In one embodiment, the present disclosure provides a method of processing data for data translation. The method comprises receiving a plurality of data from one or more users, wherein the plurality of data includes text in a source language. The method further comprises storing the plurality of data in a delimited format, wherein the plurality of data is arranged in one or more rows and one or more columns based on the plurality of information associated with one or more users, wherein the data in the one or more rows and the one or more columns are stored in the form of one or more cells comprising one or more characters. The method further comprises identifying the cell with largest character count from the one or more rows and selecting the row corresponding to the identified cell. The method further comprises determining if the source language of the selected row is a non-English text; and in response to determining that the selected row is a non-English text, transmitting the selected row to a data translation engine for conversion from source language to target language.

In another embodiment, the present disclosure provides a method of processing data for data translation. The method comprises parsing the one or more rows and selecting the row with one or more keywords, wherein the keywords include description, event details, summary and/or text. The method further comprises determining the source language of the selected row, wherein the one or more cells in the selected row with non-English texts are segregated. The method further comprises transmitting the one or more rows including the segregated one or more cells to the data translation engine for conversion from source language to the target language.

In another embodiment, the present disclosure provides a method for processing data for data translation. The method comprises identifying the one or more cells within a row having non-English language text. The method further comprises saving the identified cell at the end of the row. The method further comprises aggregating and transmitting the saved one or more rows to the data translation engine for conversion from source language to target language.

In another embodiment, the present disclosure provides a method for processing data for data translation. The method comprises receiving a plurality of data from one or more users, wherein the plurality of data comprises information from the user, including a language selected by the user. The method further comprises identifying the existing data of the user and assigning the selected language to all the existing data of the user. The method further comprises determining the selected language of the user and identifying the data as non-English, transmitting the identified plurality of data to the data translation engine, wherein the source language is converted to the target language.

In another embodiment, the present disclosure provides a data processing system for data translation. The data processing system configured to receive a plurality of data from one or more users, wherein the plurality of data includes text in a source language. The system is further configured to store the plurality of data in a delimited format, wherein the plurality of data is arranged in one or more rows and one or more columns based on the plurality of information associated with one or more users, wherein the data in the one or more rows and the one or more columns are stored in the form of one or more cells comprising characters. The system is further configured to identify the cell with largest character count from the one or more rows and select the row corresponding to the identified cell. The system is further configured to determine if the source language of the selected row is a non-English text and in response to determining that the selected row is a non-English text, transmit the selected row to a data translation engine for conversion from source language to target language.

In another embodiment, the present disclosure provides a data processing system for data translation. The data processing system configured to parse the one or more rows and select the row with one or more keywords, wherein the keywords include description, event details, summary and/or text. The system is further configured to determine the source language of the selected row, wherein the one or more cells in the selected row with non-English texts are segregated. The system is further configured to transmit the one or more rows including the segregated one or more cells to the data translation engine for conversion from source language to the target language.

In another embodiment, the present disclosure provides a data processing system for data translation, the system is configured to identify the one or more cells within a row having non-English language text. The system is further configured to save the identified cell at the end of the row and aggregate and transmit the saved one or more rows to the data translation engine for conversion from source language to target language.

In another embodiment, the present disclosure provides a data processing system for data translation. The system is configured to receive a plurality of data from one or more users, wherein the plurality of data comprises information from the user, including a language selected by the user. The system is further configured to identify the existing data of the user and assign the selected language to all the existing data of the user. The system is further configured to determine the selected language of the user and identify the data as non-English and transmit the identified plurality of data to the data translation engine, wherein the source language is converted to the target language.

In yet another embodiment, the present disclosure provides a computer program product comprising at least one non-transitory computer-readable storage medium having computer-readable program code portions stored therein executed by a processor, the computer-readable medium when executed, is configured to receive a plurality of data from one or more users, wherein the plurality of data includes text in a source language. The computer program product is further configured to store the plurality of data in a delimited format, wherein the plurality of data is arranged in one or more rows and one or more columns based on the plurality of information associated with one or more users, wherein the data in the one or more rows and the one or more columns are stored in the form of one or more cells comprising characters. The computer program product is further configured to identify the cell with largest character count from the one or more rows and selecting the row corresponding to the identified cell. The computer program product is further configured to determine if the source language of the selected row is a non-English text and in response to determining that the selected row is a non-English text, transmit the selected row to a data translation engine for conversion from source language to target language.

The above summary is provided merely for the purpose of summarizing some exemplary embodiments to provide a basic understanding of some aspects of the present disclosure. Accordingly, it will be appreciated that the above-described embodiments are merely examples and should not be construed to narrow the scope or spirit of the present disclosure in any way. It will be appreciated that the scope of the present disclosure encompasses many potential embodiments in addition to those here summarized, some of which will be further described below. Other features, aspects, and advantages of the subject will become apparent from the description, the drawings, and the claims.

BRIEF DESCRIPTION OF THE DRAWINGS

Figure 1:
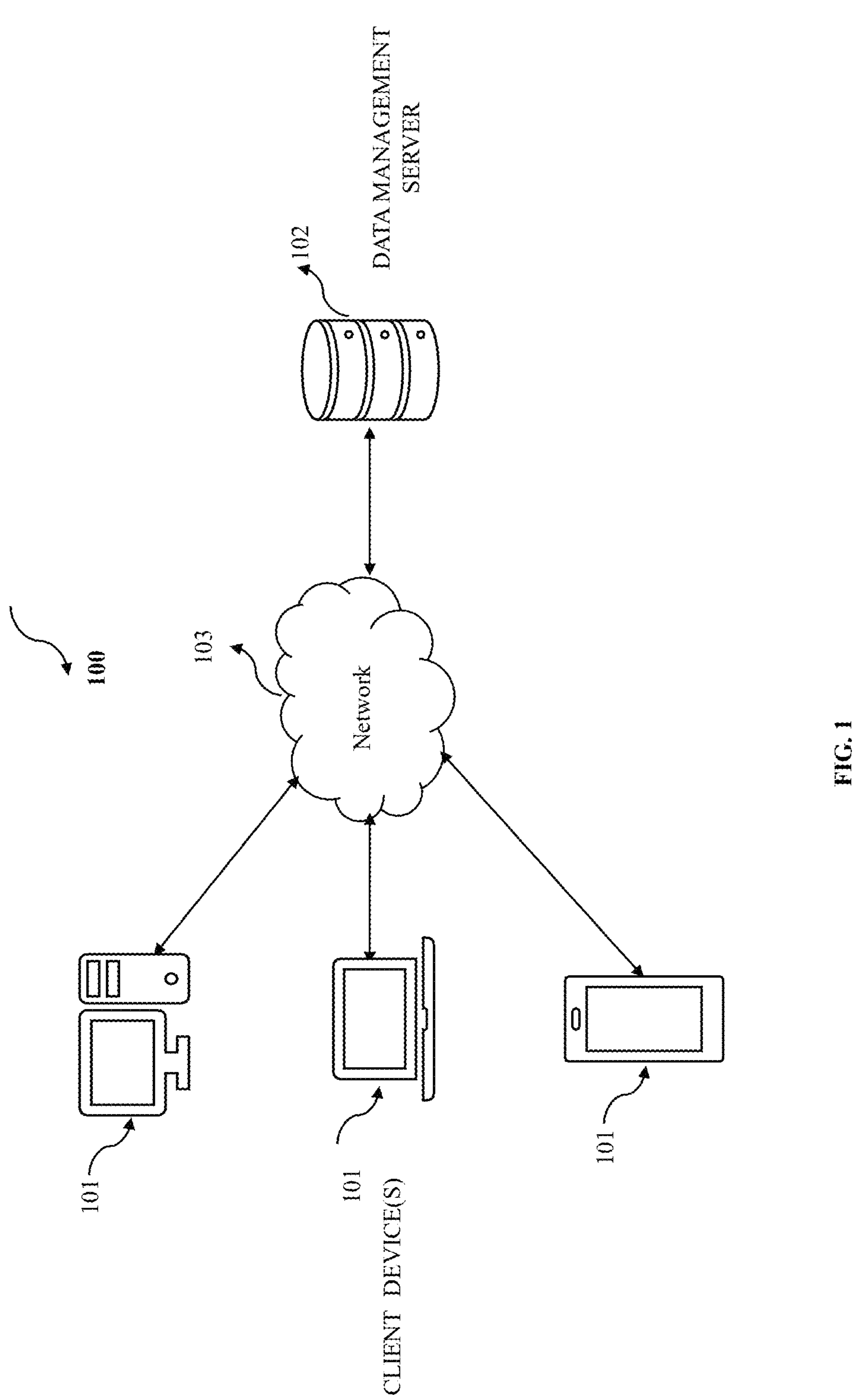
Figure 2:
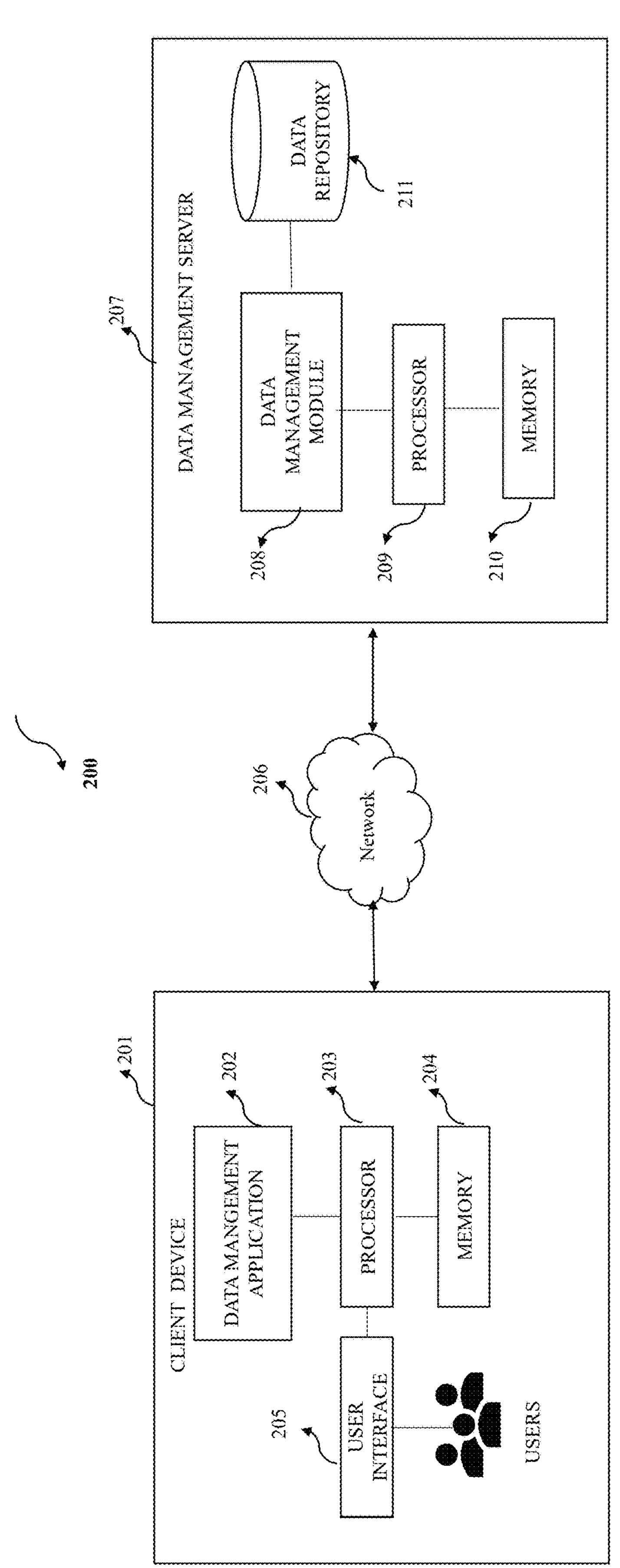
Figure 3:
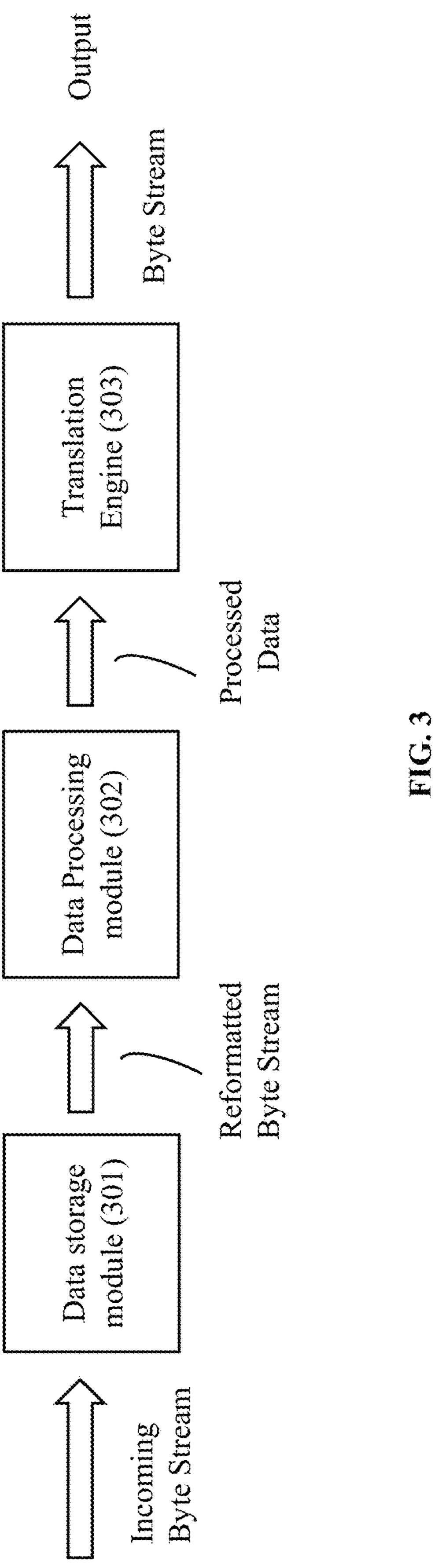
Figure 3B:
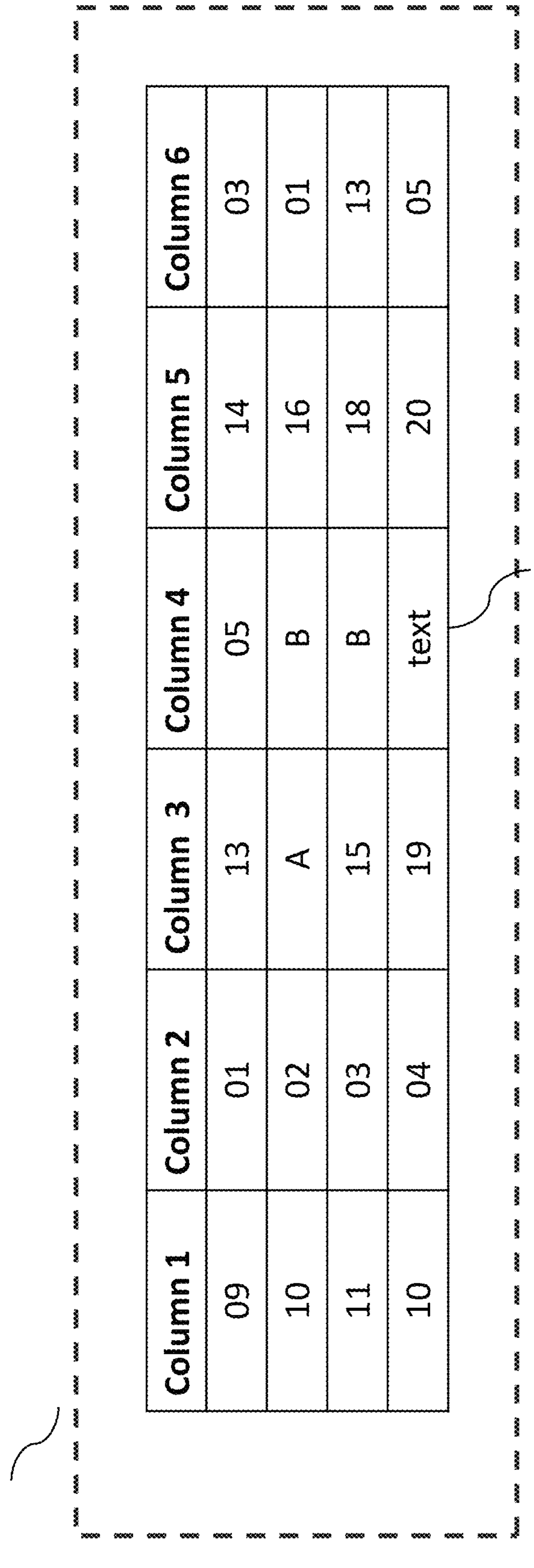
Figure 4:
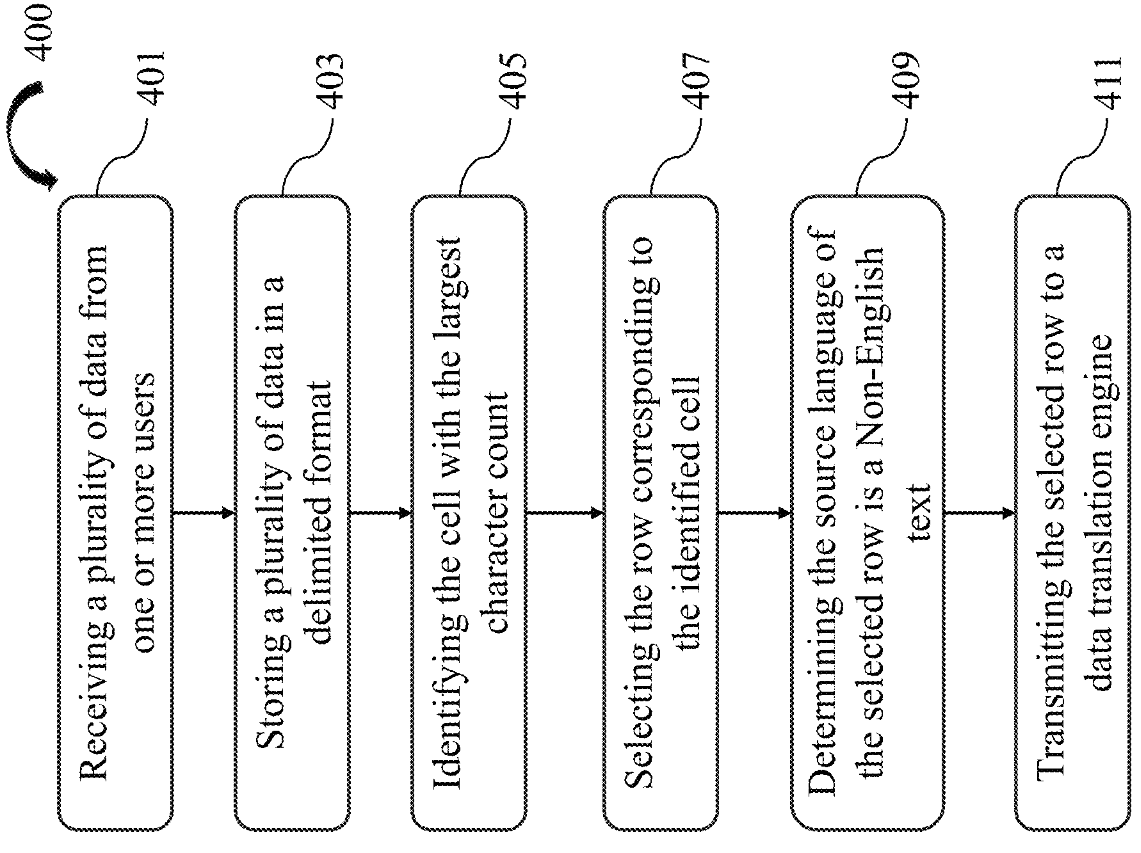
Figure 5:
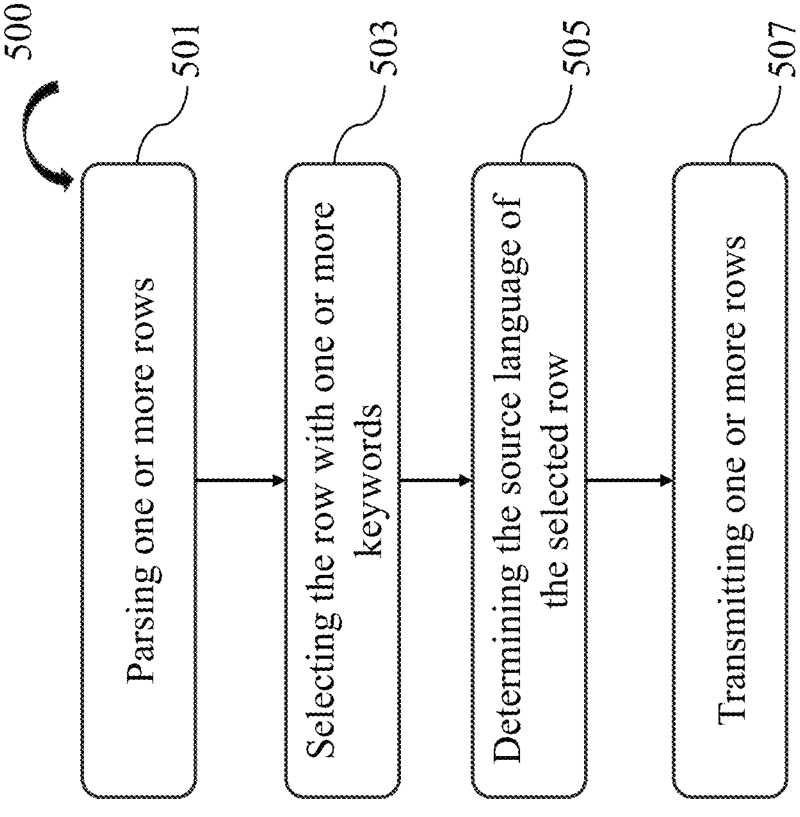
Figure 6:
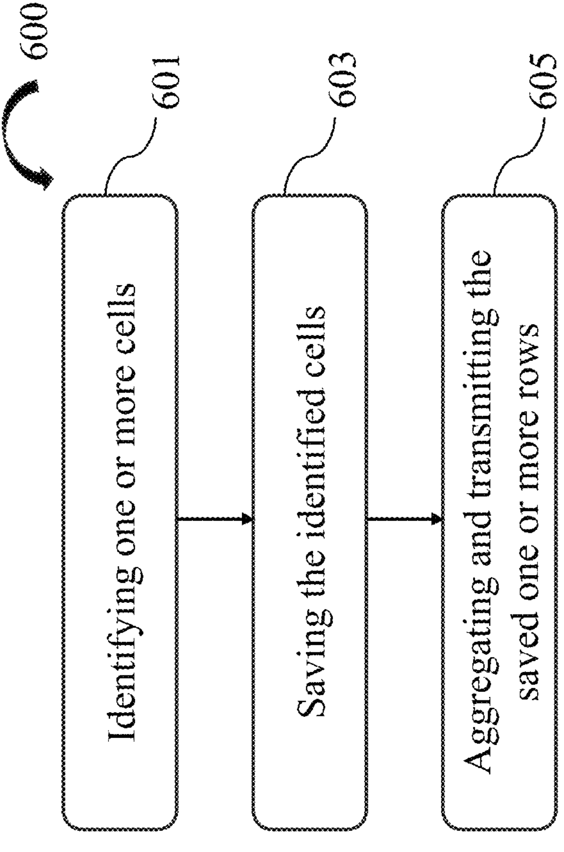
Figure 7:
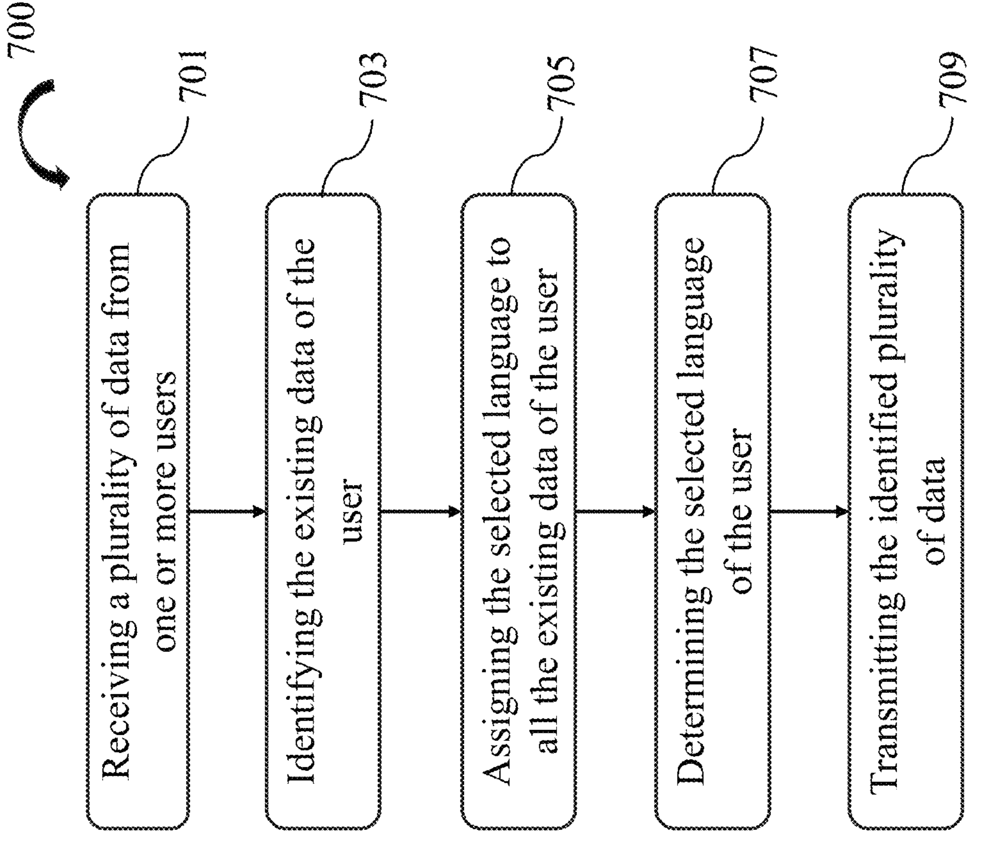
Figure 8:
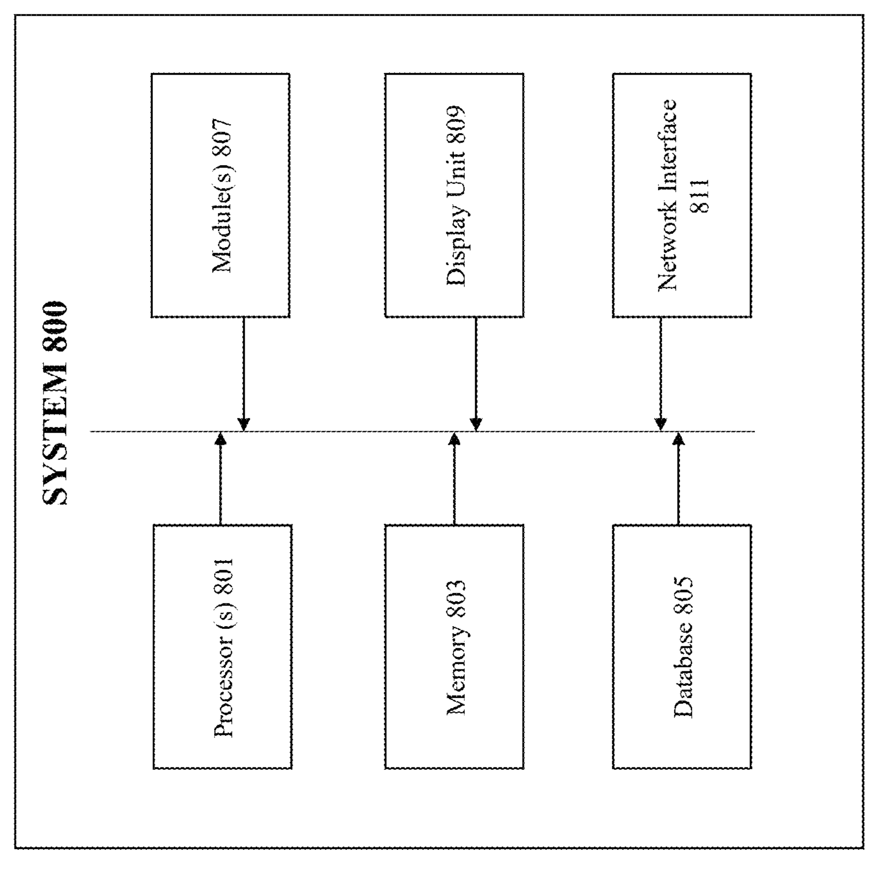

Having thus described the embodiments of the disclosure in general terms, reference now will be made to the accompanying drawings, which are not necessarily drawn to scale, and wherein:

FIG. 1 illustrates an exemplary block diagram of an environment, in which embodiments of the present disclosure may operate;

FIG. 2 illustrates an exemplary block diagram of a system for optimizing data in accordance with one or more embodiments described herein;

FIG. 3 illustrates another example of block diagram of the system depicted in FIG. 2, in accordance with an embodiment of the present disclosure;

FIG. 3*a* illustrates a block diagram of a structured data source file, in accordance with an embodiment of the present disclosure;

FIG. 3*b* illustrates another block diagram of a structured data source file, in accordance with an embodiment of the present disclosure;

FIG. 3*c* illustrates another block diagram of a structured data source file, in accordance with an embodiment of the present disclosure;

FIG. 3*d* illustrates another block diagram of a structured data source file, in accordance with an embodiment of the present disclosure;

FIG. 4 illustrates a method for processing data for data translation, in accordance with an embodiment of the present disclosure;

FIG. 5 illustrates another method for processing data for data translation, in accordance with an embodiment of the present disclosure;

FIG. 6 illustrates another method for processing data for data translation, in accordance with an embodiment of the present disclosure;

FIG. 7 illustrates another method for processing data for data translation, in accordance with an embodiment of the present disclosure; and FIG. 8 illustrates a general block diagram of the system, according to an embodiment of the present disclosure.

DETAILED DESCRIPTION OF THE INVENTION

The detailed description set forth below in connection with the appended drawings is intended as a description of various embodiments of the present invention and is not intended to represent the only embodiments in which the present invention may be practiced. Each embodiment described in this invention is provided merely as an example or illustration of the present invention, and should not necessarily be construed as preferred or advantageous over other embodiments. The detailed description includes specific details for the purpose of providing a thorough understanding of the present invention. However, it will be apparent to those skilled in the art that the present invention may be practiced without these specific details.

Some embodiments of the present disclosure now will be described more fully hereinafter with reference to the accompanying drawings, in which some, but not all, embodiments of the disclosure are shown. Indeed, embodiments of the disclosure may be embodied in many different forms and should not be construed as limited to the embodiments set forth herein, rather, these embodiments are provided so that this disclosure will satisfy applicable legal requirements. Like numbers refer to like elements throughout.

As used herein, the term “comprising” means including but not limited to and should be interpreted in the manner it is typically used in the patent context. Use of broader terms such as comprises, includes, and having should be understood to provide support for narrower terms such as consisting of, consisting essentially of, and comprised substantially of.

The phrases “in one embodiment,” “according to one embodiment,” “in some embodiments,” and the like generally mean that the particular feature, structure, or characteristic following the phrase may be included in at least one embodiment of the present disclosure, and may be included in more than one embodiment of the present disclosure (importantly, such phrases do not necessarily refer to the same embodiment).

The word “example” or “exemplary” is used herein to mean “serving as an example, instance, or illustration.” Any implementation described herein as “exemplary” is not necessarily to be construed as preferred or advantageous over other implementations FIG. 1 illustrates an exemplary block diagram of an environment 100, in which the embodiments of the present disclosure may operate. Specifically, FIG. 1 illustrates a plurality of user or client devices 101. In an embodiment, the plurality of client devices 101 may be in operative communication with a data management server 102 over a network 103. In one or more embodiments, the one or more client devices 101 is integrated within or corresponds to a mobile computing device, a smartphone, a tablet computer, a mobile computer, a desktop computer, a laptop computer, a workstation computer, a wearable device, a virtual reality device, an augmented reality device, or another type of remote computing device. Although exemplary system 100 is shown with three client devices 101, any number of client devices may be supported.

In an embodiment, the plurality of client devices 101 may be operable by one or more users to provide a plurality of data. For example, the one or more users may be customers utilizing the one or more products. One or more products may include healthcare related products including medical devices, life science application products’ etc. The plurality of data includes records but not limited to product quality review, quality management review, complaints, deviation, out of Specs, corrective & reventive actions, manufacturing processes details etc. The plurality of data collected from one or more users across the world will be in one or more languages.

According to various embodiments, a network 103 is configured to provide communication between various components depicted in FIG. 1. In some embodiments, the network 103 includes a public network (e.g., the Internet), (e.g., an internal localized, or closed-off network between particular devices). In some other embodiments, the network 103 may be a hybrid network (e.g., a network enabling internal communications between particular connected devices and external communications with other devices). Such configuration(s) include, without limitation, a wired or wireless Personal Area Network (PAN), a Cloud network, Local Area Network (LAN), Metropolitan Area Network (MAN), Wide Area Network (WAN), and/or the like. In various embodiments, the network 103 may include one or more base station(s), relay(s), router(s), switch(es), routing station(s), and/or the like.

The data management server 102 and the one or more client devices 101 are is described in greater detail in FIG. 2.

FIG. 2 is an exemplary block diagram illustrating a system 200 for optimizing the data in accordance with one or more embodiments described herein. In an embodiment, the system 200 may comprise a data management server 207 (103 of FIG. 1) for managing the data received from one or more users. In an embodiment, the data management server 207 may typically comprise a processor 209 communicably coupled to a memory 210. The processor 209 may store and execute instructions for implementing the functions of the data management server 207. In an embodiment, the data management server 207 may communicate via a communication interface with one or more client devices 201 over the network 206.

In an embodiment, the data management server 207 may include a memory 210 operatively coupled to the processor 209. The memory 210 may be non-transitory and may include, for example, one or more volatile and/or non-volatile memories. In some embodiments, the memory 210 includes or embodies an electronic storage device (e.g., a computer readable storage medium). In some embodiments, the memory 210 is configured to store information, data, content, applications, instructions, or the like, for enabling a system to carry out various operations and/or functions in accordance with example embodiments of the present disclosure.

In one or more embodiments, the system 200 may include one or more software modules or components for data optimization in accordance with the one or more embodiments of the present disclosure. In an embodiment, the one or more software modules may include but not limited to the data management module 208 which implements the functions of the data management server 207 through the processor 209. In one or more embodiments, the data management module 208 may enable the collection and effective distribution of plurality of data received in one or more languages. In an embodiment, the data management server 207 may comprise a data repository 211 containing data to be monitored, manipulated and used by the data management module 208 for data optimization. In some embodiments, the data repository 211 may comprise one or more databases storing data and information necessary for segregating the data based on various pre-conditions as required in the present disclosure. In an embodiment, the data stored in the data repository 211 may be historical data associated with users, enterprises, products, video and audio content, associated with various languages. In an embodiment, the data stored in one or more databases may be real time data or near real time data related to various languages. In one embodiment, the one or more databases may be cloud-based database. In another embodiment, the one or more databases may be a localized database.

In an embodiment, the one or more client devices 201 may also include a memory 204 operatively coupled to the processor 203. In an embodiment, the users may utilize the data management application(s) 202 of the client devices 201 for executing one or more tasks associated with the present disclosure. The data management application(s) 202 enable the users to connect to the data management server 207 through a network 206 by providing plurality of data through the user interface 205 of the or more client devices 201. In an embodiment, the data management server 103 may be responsible for managing the data given by the users of the different enterprises.

In one preferred embodiment, the data optimization system 100, 200 of the present disclosure may be configured as a cloud-based system. In various embodiments, the data management server 207 may be configured to run one or more services or software applications provided by one or more components of the system 200. In some embodiments, the services may be offered as web-based or cloud-based services to the users of the client devices 201. In one implementation, the one or more components of the system may be implemented on the data management server 207. In another implementation, one or more of the components of system 200 and/or the services provided by the components may also be implemented by one or more client devices 201. Users operating the client devices 201 may utilize one or more client applications to use the services provided by the components of the system 200.

In an embodiment, one or more modules (not shown) of the system 100, 200 may be implemented using electronic hardware, computer software, or any combination thereof. Whether such elements are implemented as hardware or software depends upon the application and design constraints imposed on the overall system. Examples of the systems may include computing systems (e.g., servers, datacenters, desktop computers, Internet of Things devices, etc.) and mobile computing systems (e.g., laptops, cell phones, etc.). Although components are described with respect to functional limitations, it should be understood that the particular implementations necessarily include the use of particular computing hardware. It should also be understood that in some embodiments certain of the components described herein include similar or common hardware.

The functions of the data management module 208 and the data management server 207 of FIG. 2 are described in greater detail in FIG. 3.

FIG. 3 illustrates another example of block diagram of the system depicted in FIG. 2, in accordance with an embodiment of the present disclosure. According to the example embodiment as depicted in FIG. 3, a data storage module 301 is coupled with a data processing module 302. In an embodiment, the data storage module 301 is configured to store input data received from one or more users in the form of bytes. In an embodiment, the data storage module 301 is further coupled with the data processing module 302. The data storage module 301 may store the plurality of input data in a specific format, for example, the plurality of data received from the one or more users may be stored in CSV format. The arrangement of data in CSV format is further illustrated in FIG. 3*a*. The stored plurality of data may be provided to the data processing module 302. The data processing module 302 may process the received plurality of data as per the method steps illustrated in FIG. 4-6.

For illustration, the data processing module 302 may be configured to receive the plurality of data from one or more users 101. In an example, the plurality of data received may be in plurality of languages. The language of the input data may be called as the source language. The source language of the plurality of data may include text from various languages including English. The data processing module 302 may be further configured to store the plurality of data in a delimited format as illustrated in FIG. 3*a*. In an example, the plurality of data may be arranged in one or more rows and one or more columns based on the plurality of information associated with one or more users 101. In another example, the data in the one or more rows and the one or more columns may be stored in the form of one or more cells comprising one or more characters.

The data processing module 302 may be further configured to identify the cell with largest character count from the one or more rows and selecting the row corresponding to the identified cell. The largest character count cell in the one or more rows or the one or more columns may have the source language as English or non-English text. The data processing module 302 may be further configured to determine that the selected row is a non-English text, transmitting the selected row to a data translation engine for conversion from source language to target language. The unselected rows may not be sent to the data translation engine for translation.

In another embodiment of the present disclosure, the data processing module 302 may be configured to receive the plurality of data from one or more users 101. In an example, the plurality of data received may be in plurality of languages. The language of the input data may be called as the source language. The source language of the plurality of data may include text from various languages including English. Further, the data processing module 302 may be configured to store the plurality of data in a delimited format as illustrated in FIG. 3*a*. In an example, the plurality of data may be arranged in one or more rows and one or more columns based on the plurality of information associated with one or more users 101. In another example, the data in the one or more rows and the one or more columns may be stored in the form of one or more cells comprising one or more characters.

Thereafter, the data processing module 302 may be configured to parse the one or more rows and selecting the row with one or more keywords. In an example, the keywords may include words such as description, event details, summary and/or text etc. Further, the data processing module 302 may be configured to determine the source language of the selected row. In an example, the one or more cells in the selected row may contain English and non-English text. The one or more row with non-English texts are segregated.

Further, the data processing module 302 may be configured to transmit the one or more rows including the segregated one or more cells to the data translation engine for conversion from source language to the target language. The unselected rows may not be sent to the data translation engine for translation.

According to another embodiment of the present disclosure, the data processing module 302 may be configured to receive the plurality of data from one or more users 101. In an example, the plurality of data received may be in a plurality of languages. The language of the input data may be called as the source language. The source language of the plurality of data may include text from various languages including English. Further, the data processing module 302 may be configured to store the plurality of data in a delimited format as illustrated in FIG. 3*a*. In an example, the plurality of data may be arranged in one or more rows and one or more columns based on the plurality of information associated with one or more users 101. In another example, the data in the one or more rows and the one or more columns may be stored in the form of one or more cells comprising one or more characters.

Thereafter, the data processing module 302 may be configured to identify the one or more cells within a row having non-English language text. The one or more rows may contain English and non-English text. The English text cells may be ignored at this step. Further, the data processing module 302 may be further configured to save the identified cell at the end of the row. The data processing module 302 may be further configured to aggregate and transmit the saved one or more rows to the data translation engine for conversion from source language to target language. The unselected rows may not be sent to the data translation engine for translation.

According to an embodiment, the data processing module 302 may be further configured to receiving the plurality of data from one or more users 101. In an example, the plurality of data received may be in a plurality of languages. The language of the input data may be called as the source language. The source language of the plurality of data may include text from various languages including English. Further, the data processing module 302 may be configured to store the plurality of data in a delimited format as illustrated in FIG. 3*a*. In an example, the plurality of data may be arranged in one or more rows and one or more columns based on the plurality of information associated with one or more users 101. In another example, the data in the one or more rows and the one or more columns may be stored in the form of one or more cells comprising one or more characters.

Thereafter, the data processing module 302 may be configured to receive a plurality of data from one or more users. The plurality of data may be received from the one or more users 101 directly. The received information may contain the source language of the data and the same may be received from the one or more 101 users. The data processing module 302 may be further configured to identify the existing data of the user and assigning the selected language to all the existing data of the user. The already existing data in the name of the user at the data management server may also be considered to be in the same language. The data processing module 302 may be further configured to determine the selected language of the user and identifying the data as non-English. The data processing module 302 may be further configured to transmit the identified plurality of data to the data translation engine, wherein the source language is converted to the target language. The unselected rows may not be sent to the data translation engine for translation.

In another embodiment, the data processing module is coupled with a data translation engine 303. The data translation engine 303 may receive the processed plurality of data from the data processing module 302. The data translation engine may transfer the language of plurality of data (source language) to the desired language.

FIG. 3*a* illustrates a block diagram of a structured data source file 300*a* as processed in the data processing module 302 in accordance with embodiment of the present disclosure. The source file 300*a* contains structured data having a plurality of records organized into rows and columns. For example, the source file contains values having characters (e.g., "A", "B", "C", "D", "E", etc.) arranged in a 4-row by 6-column table format. The structured source file 300*a* is rendered in FIG. 3*a* in a table format for sake of illustration, but it is understood that the structured data may be encoded in a variety of formats. For example, the source file 300*a* may be a delimiter-separated file (such as a CSV file) containing a plurality of records (i.e., lines), where each record is comprised of fields separated by a delimiter (e.g., comma). In another embodiment of the disclosure, the structured source file 300*a* may be a log file containing a plurality of log entries, e.g., separated by a tab or whitespace character. The source file may be in English or Non-English text. The language of the source file may be called "source language".

The 4-row by 6-column table is stored with plurality of data. The plurality of data may contain characters of different length. The various length character counts may be stored in the different rows and columns. For example, the characters may be "ABCD" or ABCDE". In an embodiment of the disclosure, the plurality of data stored in the one or more rows is parsed to find the largest character count in order to determine the source language. The cell with the largest character count is identified and the row which corresponds to the cell is selected and processed. The cell with the largest character count as illustrated in FIG. 3*a* is "ABCDE", which is placed in the column 3 and row 2. In another embodiment of the disclosure, the row 2, as illustrated in FIG. 3*a*, with largest character count cell may be selected and processed in accordance with the process as illustrated in FIG. 4.

FIG. 3*b* illustrates a block diagram of a structured data source file 300*b* as processed in the data processing module 302 in accordance with embodiment of the present disclosure. The source file 300*b* contains structured data having a plurality of records organized into rows and columns. For example, the source file contains values arranged in a 4-row by 6-column table format. The structured source file 300*b* is rendered in FIG. 3*b* in a table format for sake of illustration, but it is understood that the structured data may be encoded in a variety of formats. For example, the source file 300*b* may be a delimiter-separated file (such as a CSV file)

containing a plurality of records (i.e., lines), where each record is comprised fields separated by a delimiter (e.g., comma). In another embodiment of the invention, the structured source file 300*b* may be a log file containing a plurality of log entries, e.g., separated by a tab or whitespace character. The source file may be in English or Non-English text.

The 4-row by 6-column table is stored with plurality of data. The plurality of data may contain different key words such as description, event details, summary and text. The keywords may be stored in the different rows and columns. For example, in the FIG. 3*b*, the keyword "text" is stored in a row which is denoted as 301*b*. In an embodiment of the disclosure, the one or more rows are parsed to find the keyword and the row with the keyword 301*b* is selected as illustrated in FIG. 3*b*. In an embodiment of the present disclosure, the source language of the selected row is determined and if the row contains non-English texts then the row is transferred to the data translation engine for conversion from source language to the target language in accordance with the process as illustrated in FIG. 5.

FIG. 3*c* illustrates a block diagram of a structured data source file 300*c* as processed in the data processing module 302 in accordance with embodiment of the present disclosure. The source file 300*c* contains structured data having a plurality of records organized into rows and columns. For example, the source file contains values having characters (e.g., "A", "B", "C", "D", "E", etc.) arranged in a 14-row by 2-column table format. The structured source file 300*c* is rendered in FIG. 3*c* in a table format for sake of illustration, but it is understood that the structured data may be encoded in a variety of formats. For example, the source file 300*c* may be a delimiter-separated file (such as a CSV file) containing a plurality of records (i.e., lines), where each record is comprised fields separated by a delimiter (e.g., comma). In another embodiment of the, the structured source file 300*c* may be a log file containing a plurality of log entries, e.g., separated by a tab or whitespace character. The source file may be in English or Non-English text.

The 14-row by 2-column table is stored with plurality of data. The plurality of data may contain be stored in different rows and columns. In an embodiment of the, from the plurality of data stored in the one or more rows the one or more cells within non-English language text is identified and saved in the end of the row by the data processing module 302. The text is stored in the end of the row as illustrated in FIG. 301*c*. The one or more rows with the non-English text is aggregated and transmitted to the data translation engine for conversion from source language to target language in accordance with the process as illustrated in FIG. 7.

FIG. 3*d* illustrates a block diagram depicting a structured data source file 300*d* as processed in the data processing module 302 in accordance with embodiment of the present disclosure. The source file 300*d* contains structured data having a plurality of records organized into rows and columns. For example, the source file contains values having characters (e.g., "A", "B", "C", "D", "E", etc.) arranged in a 4-row by 3-column table format. The structured source file 300*d* is rendered in FIG. 3*d* in a table format for sake of illustration, but it is understood that the structured data may be encoded in a variety of formats. For example, the source file 300*d* may be a delimiter-separated file (such as a CSV file) containing a plurality of records (i.e., lines), where each record is comprised fields separated by a delimiter (e.g., comma). In another embodiment of the disclosure, the structured source file 300*d* may be a log file containing a plurality of log entries, e.g., separated by a tab or whitespace character. The source file may be in English or Non-English text. The language of the source file is called as "source language".

The 4-row by 3-column table is stored with plurality of data. The plurality of data may contain inputs from the one or more users 301*d*. The various data such as user name, location and other details received as input may be stored in the different rows and columns. In an embodiment of the disclosure, the plurality of data is received from the one or more users. The plurality of data comprises information from the user, including language and personal details selected by the user as illustrated in FIG. 300*d*. The previous data 302*d* of the user is identified and the selected language is assigned to all the existing data of the user. The plurality of data is transferred to the data translation engine, in accordance with the process as illustrated in FIG. 7.

FIG. 4 illustrates a method for processing data for data translation, in accordance with an embodiment of the present disclosure. The method 400 is implemented in the system as illustrated in FIGS. 1-3*a*. According to an embodiment, the method 400 may be implemented with the processor(s) 209, various modules. An explanation of the various modules is explained through FIGS. 1-3*a* and 10, therefore detailed explanation of the same is omitted here for the sake of brevity.

According to an embodiment, at operation 401, the method 400 includes receiving the plurality of data from one or more users 101. In an example, the plurality of data received may be in plurality of languages. The language of the input data may be called as the source language. The source language of the plurality of data may include text from various languages including English. The method 400, at operation 403, includes storing the plurality of data in a delimited format as illustrated in FIG. 3*a*. In an example, the plurality of data may be arranged in one or more rows and one or more columns based on the plurality of information associated with one or more users 101. In another example, the data in the one or more rows and the one or more columns may be stored in the form of one or more cells comprising one or more characters.

Further, the method 400, at operation 405 and 407, includes identifying the cell with largest character count from the one or more rows and selecting the row corresponding to the identified cell. The largest character count cell in the one or more rows or the one or more columns may have the source language as English or non-English text. The method 400, at operation 409 and 411, includes determining that the selected row is a non-English text, transmitting the selected row to a data translation engine for conversion from source language to target language. The unselected rows may not be sent to the data translation engine for translation.

FIG. 5 illustrates a method for processing data for data translation, in accordance with an embodiment of the present disclosure. The method 500 is implemented in the system as illustrated in FIGS. 1-3*a*. According to an embodiment, the method 500 may be implemented with the processor(s) 209, various modules. An explanation of the various modules is explained through FIGS. 1-3*a* and 10, therefore detailed explanation of the same is omitted here for the sake of brevity.

According to an embodiment, at operation 500, the method may be receiving the plurality of data from one or more users 101. In an example, the plurality of data received may be in plurality of languages. The language of the input data may be called as the source language. The source language of the plurality of data may include text from various languages including English. Further, the method 500 may be storing the plurality of data in a delimited format as illustrated in FIG. 3*a*. In an example, the plurality of data may be arranged in one or more rows and one or more columns based on the plurality of information associated with one or more users 101. In another example, the data in the one or more rows and the one or more columns may be stored in the form of one or more cells comprising one or more characters.

Thereafter, at operation 501 and 503, the method 500 includes parsing the one or more rows and selecting the row with one or more keywords. In an example, the keywords may include words such as description, event details, summary and/or text etc. Further, at operation 505, includes determining the source language of the selected row. In an example, the one or more cells in the selected row may contain English and non-English text. The one or more row with non-English texts are segregated.

Further, the at operation 507, the method 500 includes transmitting the one or more rows including the segregated one or more cells to the data translation engine for conversion from source language to the target language. The unselected rows may not be sent to the data translation engine for translation.

FIG. 6 illustrates a method for processing data for data translation, in accordance with an embodiment of the present disclosure. The method 600 is implemented in the system as illustrated in FIGS. 1-3*a*. According to an embodiment, the method 600 may be implemented with the processor(s) 209, various modules. An explanation of the various modules is explained through FIGS. 1-3*a* and 10, therefore detailed explanation of the same is omitted here for the sake of brevity.

According to an embodiment, at operation 600, the method may be receiving the plurality of data from one or more users 101. In an example, the plurality of data received may be in a plurality of languages. The language of the input data may be called as the source language. The source language of the plurality of data may include text from various languages including English. Further, the method 600 may be storing the plurality of data in a delimited format as illustrated in FIG. 3*a*. In an example, the plurality of data may be arranged in one or more rows and one or more columns based on the plurality of information associated with one or more users 101. In another example, the data in the one or more rows and the one or more columns may be stored in the form of one or more cells comprising one or more characters.

Thereafter, at operation 601, the method 600 includes identifying the one or more cells within a row having non-English language text. The one or more rows may contain English and non-English text. The English text cells may be ignored at this step. Further, at operation 603, the method 600 includes saving the identified cell at the end of the row. At operation 605, the method includes aggregating and transmitting the saved one or more rows to the data translation engine for conversion from source language to target language. The unselected rows may not be sent to the data translation engine for translation.

FIG. 7 illustrates a method for processing data for data translation, in accordance with an embodiment of the present disclosure. The method 700 is implemented in the system as illustrated in FIGS. 1-3*a*. According to an embodiment, the method 700 may be implemented with the processor(s) 209, various modules. An explanation of the various modules is explained through FIGS. 1-3*a* and 10, therefore detailed explanation of the same is omitted here for the sake of brevity.

According to an embodiment, at operation 700, the method may be receiving the plurality of data from one or more users 101. In an example, the plurality of data received may be in a plurality of languages. The language of the input data may be called as the source language. The source language of the plurality of data may include text from various languages including English. Further, the method 700 may be storing the plurality of data in a delimited format as illustrated in FIG. 3*a*. In an example, the plurality of data may be arranged in one or more rows and one or more columns based on the plurality of information associated with one or more users 101. In another example, the data in the one or more rows and the one or more columns may be stored in the form of one or more cells comprising one or more characters.

Thereafter, at operation 701, the method 700 includes receiving a plurality of data from one or more users. The plurality of data may be received from the one or more users 101 directly. The received information may contain the source language of the data and the same may be received from the one or more 101 users. Further, at operation 703 and 705, the particular user from the one or more user may be identified and correlated with the data collected, the method 700 includes identifying the existing data of the user and assigning the selected language to all the existing data of the user. The already existing data in the name of the user at the data management server may also be considered to be in the same language. Further, at operation 707, the method 700 includes determining the selected language of the user and identifying the data as non-English. Further, at operation 709, the method 700 includes transmitting the identified plurality of data to the data translation engine, wherein the source language is converted to the target language. The unselected rows may not be sent to the data translation engine for translation.

FIG. 8 illustrates a general block diagram of the system, according to an embodiment of the present disclosure.

In an example, the processor(s) 801 may be a single processing unit or a number of units, all of which could include multiple computing units. The processor(s) 801 may be implemented as one or more microprocessors, microcomputers, microcontrollers, digital signal processors, central processing units, logical processors, virtual processors, state machines, logic circuitries, and/or any devices that manipulate signals based on operational instructions. Among other capabilities, the processor(s) 801 is configured to fetch and execute computer-readable instructions and data stored in the memory 803.

The memory 803 may include any non-transitory computer-readable medium known in the art including, for example, volatile memory, such as static random access memory (SRAM) and dynamic random access memory (DRAM), and/or non-volatile memory, such as read-only memory (ROM), erasable programmable ROM, flash memories, hard disks, optical disks, and magnetic tapes.

In an example, the module(s), engine(s), and/or unit(s) 807 may include a program, a subroutine, a portion of a program, a software component or a hardware component capable of performing a stated task or function. As used herein, the module(s), engine(s), and/or unit(s) may be implemented on a hardware component such as a server independently of other modules, or a module can exist with other modules on the same server, or within the same program. The module(s), engine(s), and/or unit(s) 803 may be implemented on a hardware component such as processor one or more microprocessors, microcomputers, microcontrollers, digital signal processors, central processing units, state machines, logic circuitries, and/or any devices that manipulate signals based on operational instructions. The module(s), engine(s), and/or unit(s) 803 when executed by the processor(s) 801 may be configured to perform any of the described functionalities.

As a further example, the database 805 may be implemented with integrated hardware and software. The hardware may include a hardware disk controller with programmable search capabilities or a software system running on general-purpose hardware. Examples of databases are but not limited to, in-memory databases, cloud databases, distributed databases, embedded databases, and the like. The database amongst other things, serves as a repository for storing data processed, received, and generated by one or more of the processor(s) 801, and the modules/engines/units 805.

The modules/engines/units 805 may be implemented with an AI module that may include a plurality of neural network layers. Examples of neural networks include, but are not limited to, a convolutional neural network (CNN), a deep neural network (DNN), a recurrent neural network (RNN), a Restricted Boltzmann Machine (RBM). The learning technique is a method for training a predetermined target device using a plurality of learning data to cause, allow, or control the target device to make a determination or prediction. Examples of the learning techniques include, but are not limited to, a supervised learning, an unsupervised learning, a semi-supervised learning, or a reinforcement learning. At least one of a plurality of CNN, DNN, RNN, RMB models and the like may be implemented to thereby achieve execution of the present subject matter's mechanism through an AI model. A function associated with the AI model may be performed through the non-volatile memory, the volatile memory, and the processor. The processor may include one or a plurality of processors. At this time, one or a plurality of processors may be a general-purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU). The one or a plurality of processors control the processing of the input data in accordance with a predefined operating rule or the artificial intelligence (AI) model stored in the non-volatile memory and the volatile memory. The predefined operating rule or artificial intelligence model is provided through training or learning.

As an example, the display unit 807 includes a computer monitor, a touch screen, an output device capable of displaying the graphics, and the like. The display unit 807 is configured to display visual output in desktops, laptops, and workstations.

As a further example, the network interface 809 is configured to provide and establish communication with any electronic device via a public network, private network, or any wireless communication technology.

The disclosed system and method may thereby be used for automating the product recall management process. The issues that can arise due to the dispatch of faulty products are crucial. More, particularly for the pharmaceutical and medical industries, maintaining consumer safety and regulatory compliance is paramount. Thus, when the organization needs to recall its faulty products due to various reasons as explained in the background section, the conventional method of manually sending notifications or emails is inefficient, time-consuming, and prone to errors as the end users are generally very large in numbers. The disclosed techniques provide an effective method for automating the filing of the consignment recalling templates. The system automatically populates the relevant data to be filled in respective fields of the consignment recalling template by retrieving appropriate data from the entity's database. The implementation of the semantic similarity or vector similarity techniques aids in retrieving appropriate data from the entity's database in spite of the manner the information is maintained therein. Accordingly, the disclosed techniques significantly improve the accuracy of information retrieval, thereby providing accurate recommendations and auto-filling of the consignment recalling templates.

The figures of the disclosure are provided to illustrate some examples of the invention described. The figures are not to limit the scope of the depicted embodiments of the appended claims. Aspects of the disclosure are described herein with reference to the invention to example embodiments for illustration. It should be understood that specific details, relationships, and method are set forth to provide a full understanding of the example embodiments. One of ordinary skill in the art recognize the example embodiments can be practiced without one or more specific details and/or with other methods.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Aspects of the present disclosure may be implemented as computer program products that comprise articles of manufacture. Such computer program products may include one or more software components including, for example, applications, software objects, methods, data structure, and/or the like. In some embodiments, a software component may be stored on one or more non-transitory computer-readable media, which computer program product may comprise the computer-readable media with software component, comprising computer executable instructions, included thereon. The various control and operational systems described herein may incorporate one or more of such computer program products and/or software components for causing the various conveyors and components thereof to operate in accordance with the functionalities described herein.

A software component may be coded in any of a variety of programming languages. An illustrative programming language may be a lower-level programming language such as an assembly language associated with a particular hardware architecture and/or operating system platform/system. Other example of programming languages included, but are not limited to, a macro language, a shell or command language, a job control language, a scripting language, a database query, or search language, and/or report writing language. In one or more example embodiments, a software component comprising instructions in one of the foregoing examples of programming languages may be executed directly by an operating system or other software component without having to be first transformed into another form. A software component may be stored as a file or other data storage methods. Software components of a similar type or functionally related may be stored together such as, for example, in a particular directory, folder, or repository. Software components may be static (e.g., pre-established, or fixed) or dynamic (e.g., created or modified at the time of execution).

While this specification contains many specific implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

It is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation, unless described otherwise.

What is claimed:

1. A method of processing data for data translation, comprising:

receiving, by a data management server, a plurality of data from one or more users, wherein the plurality of data includes text in a source language;

storing, by the data management server, the plurality of data in a delimited format, wherein the plurality of data is arranged in one or more rows and one or more columns based on the plurality of information associated with one or more users, wherein the data in the one or more rows and the one or more columns are stored in the form of one or more cells comprising one or more characters;

parsing, by the data management server, the one or more rows to determine the one or more cells containing textual description comprising of one or more keywords;

identifying, by the data management server, the cell with largest character count from among the one or more determined cells containing the textual description from the one or more rows and selecting the row corresponding to the identified cell;

determining, by the data management server, if the source language of the selected row is a non-English text;

segregating, by the data management server, at least one cell in the selected row containing the non-English text; and in response to determining that the selected row is a non-English text, transmitting, by the data management server, the selected row comprising the segregated at least one cell to a data translation engine for conversion from source language to target language.

2. The method of claim 1, wherein the one or more cells include English and Non-English texts.

3. The method of claim 1, wherein the information associated with one or more user includes complaints, deviation, corrective and preventive actions, manufacturing processes details.

4. The method of claim 1, wherein the delimited format is a CSV format.

5. The method of claim 1, wherein the one or more user is a customer located across the world.

6. The method of claim 1, further comprising:

parsing the one or more rows and selecting the row with one or more keywords, wherein the keywords include description, event details, summary and/or text.

7. The method of claim 1, further comprising:

identifying the one or more cells within a row having non-English language text;

saving the identified cell at the end of the row; and aggregating and transmitting the saved one or more rows to the data translation engine for conversion from source language to target language.

8. The method of claim 1, further comprising:

receiving a plurality of data from one or more users, wherein the plurality of data comprises information from the user, including a language selected by the user;

identifying the existing data of the user and assigning the selected language to all the existing data of the user;

determining the selected language of the user and identifying the data as non-English, transmitting the identified plurality of data to the data translation engine, wherein the source language is converted to the target language.

9. A data processing system for data translation, comprising:

a memory;

a data translation engine; and one or more processor configured to:

receive a plurality of data from one or more users, wherein the plurality of data includes text in a source language;

store the plurality of data in a delimited format, wherein the plurality of data is arranged in one or more rows and one or more columns based on the plurality of information associated with one or more users, wherein the data in the one or more rows and the one or more columns are stored in the form of one or more cells comprising characters;

parse the one or more rows to determine the one or more cells containing textual description comprising of one or more keywords;

identify the cell with largest character count from among the one or more determined cells containing the textual description from the one or more rows and select the row corresponding to the identified cell;

determine if the source language of the selected row is a non-English text;

segregate at least one cell in the selected row containing the non-English text; and in response to determining that the selected row is a non-English text, transmit the selected row comprising the segregated at least one cell to a data translation engine for conversion from source language to target language.

10. The data processing system of claim 9, wherein the one or more cells include English and Non-English texts.

11. The data processing system of claim 9, wherein the information associated with one or more user includes complaints, deviation, corrective and preventive actions, manufacturing processes details.

12. The data processing system of claim 9, wherein the delimited format is a CSV format.

13. The data processing system of claim 9, wherein the one or more user is a customer located across the world.

14. The data processing system of claim 9, wherein the processor is configured to:

parse the one or more rows and select the row with one or more keywords, wherein the keywords include description, event details, summary and/or text.

15. The data processing system of claim 9, wherein the processor is configured to identify the one or more cells within a row having non-English language text;

save the identified cell at the end of the row; and aggregate and transmit the saved one or more rows to the data translation engine for conversion from source language to target language.

16. The data processing system of claim 9, wherein the processor is configured to receive a plurality of data from one or more users, wherein the plurality of data comprises information from the user, including a language selected by the user;

identify the existing data of the user and assign the selected language to all the existing data of the user;

determine the selected language of the user and identify the data as non-English; and transmit the identified plurality of data to the data translation engine, wherein the source language is converted to the target language.

17. A non-transitory computer-readable storage medium storing program instructions for processing data for data translation, perform the steps of:

receiving, by a data management server, a plurality of data from one or more users, wherein the plurality of data includes text in a source language;

storing, by the data management server, the plurality of data in a delimited format, wherein the plurality of data is arranged in one or more rows and one or more columns based on the plurality of information associated with one or more users, wherein the data in the one or more rows and the one or more columns are stored in the form of one or more cells comprising characters;

parsing, by the data management server, the one or more rows to determine the one or more cells containing textual description comprising of one or more keywords;

identifying, by the data management server, the cell with largest character count from among the one or more determined cells containing the textual description from the one or more rows and selecting the row corresponding to the identified cell;

determining, by the data management server, if the source language of the selected row is a non-English text;

segregating, by the data management server, at least one cell in the selected row containing the non-English text; and in response to determining that the selected row is a non-English text, transmitting, by the data management server, the selected row comprising the segregated at least one cell to a data translation engine for conversion from source language to target language.

18. The non-transitory computer-readable storage medium of claim 17, further comprising program instructions to perform the steps of:

parsing the one or more rows and selecting the row with one or more keywords, wherein the keywords include description, event details, summary and/or text.

19. The non-transitory computer-readable storage medium of claim 17, further comprising program instructions to perform the steps of:

identifying the one or more cells within a row having non-English language text;

saving the identified cell at the end of the row; and aggregating and transmitting the saved one or more rows to the data translation engine for conversion from source language to target language.

20. The non-transitory computer-readable storage medium of claim 17, further comprising program instructions to perform the steps of:

receiving a plurality of data from one or more users, wherein the plurality of data comprises information from the user, including a language selected by the user;

identifying the existing data of the user and assigning the selected language to all the existing data of the user;

determining the selected language of the user and identifying the data as non-English, transmitting the identified plurality of data to the data translation engine, wherein the source language is converted to the target language.

* * * * *